(12) United States Patent
Nakagawa et al.

(10) Patent No.: US 11,565,172 B2
(45) Date of Patent: Jan. 31, 2023

(54) INFORMATION PROCESSING APPARATUS, INFORMATION PROCESSING METHOD, AND INFORMATION PROCESSING APPARATUS-READABLE RECORDING MEDIUM

(71) Applicant: SONY CORPORATION, Tokyo (JP)

(72) Inventors: Ayumi Nakagawa, Kanagawa (JP); Ikuo Yamano, Tokyo (JP); Yusuke Nakagawa, Kanagawa (JP); Takeshi Igarashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/253,281

(22) PCT Filed: Jun. 18, 2019

(86) PCT No.: PCT/JP2019/024076
§ 371 (c)(1),
(2) Date: Dec. 17, 2020

(87) PCT Pub. No.: WO2020/008862
PCT Pub. Date: Jan. 9, 2020

(65) Prior Publication Data
US 2021/0121776 A1 Apr. 29, 2021

(30) Foreign Application Priority Data
Jul. 2, 2018 (JP) .............................. JP2018-125899

(51) Int. Cl.
*A63F 13/215* (2014.01)
*A63F 13/285* (2014.01)
*A63F 13/54* (2014.01)

(52) U.S. Cl.
CPC .......... *A63F 13/215* (2014.09); *A63F 13/285* (2014.09); *A63F 13/54* (2014.09)

(58) Field of Classification Search
CPC ....... A63F 13/215; A63F 13/285; A63F 13/54
See application file for complete search history.

(56) References Cited

U.S. PATENT DOCUMENTS

2011/0309946 A1* 12/2011 Jonsson ............ H04M 1/72448
340/686.6
2013/0150117 A1* 6/2013 Rodriguez ............ G10L 15/285
455/550.1

(Continued)

FOREIGN PATENT DOCUMENTS

| JP | 2014-174988 A | 9/2014 |
| JP | 2015-215712 A | 12/2015 |
| JP | 2015-231098 A | 12/2015 |

*Primary Examiner* — Thomas J Hong
*Assistant Examiner* — Carl V Larsen
(74) *Attorney, Agent, or Firm* — Paratus Law Group, PLLC

(57) ABSTRACT

There is provided an information processing apparatus, an information processing method, and an information processing apparatus-readable recording medium that are capable of adjusting sound caused by vibration of a vibration output unit that vibrates an input device in accordance with the surrounding situation of a game user. The information processing apparatus includes a vibration control unit. The vibration control unit controls vibration of a vibration output unit to change a sound caused by the vibration of the vibration output unit on a basis of surrounding environment information of an input device including a vibration output unit, the input device being held by a user.

14 Claims, 10 Drawing Sheets

(56) References Cited

U.S. PATENT DOCUMENTS

| | | | |
|---|---|---|---|
| 2014/0253303 A1* | 9/2014 | Levesque | A61B 5/0002 340/407.1 |
| 2015/0273322 A1* | 10/2015 | Nakagawa | A63F 13/285 463/37 |
| 2015/0323996 A1* | 11/2015 | Obana | A63F 13/2145 345/177 |
| 2017/0053502 A1* | 2/2017 | Shah | G08B 6/00 |
| 2017/0136354 A1* | 5/2017 | Yamano | A63F 13/92 |
| 2017/0192401 A1* | 7/2017 | Wexler | G06F 3/16 |

\* cited by examiner

| Distance d from surrounding person | Score |
|---|---|
| d<50cm | -10 |
| 50cm≦d<100cm | 8 |
| 100cm≦d<200cm | 4 |
| d>200cm | -6 |

(A)

| Attributed information of surrounding person | Score |
|---|---|
| Age 0 to 19 year old | 10 |
| Age 20 to 49 year old | 6 |
| Age 50 to 69 year old | 0 |
| Age under 70 year old | -10 |

(B)

| Action information of surrounding person | Score |
|---|---|
| Reading a book | 10 |
| Listening to music | -10 |
| Sleeping | 8 |
| ... | ... |

| Value of Nv | Control pattern |
|---|---|
| $Nv \geq Na$ | Pattern A |
| $Na > Nv > Nb$ | Pattern B |
| $Nb \geq Nv$ | Pattern C |

INFORMATION PROCESSING APPARATUS, INFORMATION PROCESSING METHOD, AND INFORMATION PROCESSING APPARATUS-READABLE RECORDING MEDIUM

CROSS REFERENCE TO PRIOR APPLICATION

This application is a National Stage Patent Application of PCT International Patent Application No. PCT/JP2019/024076 (filed on Jun. 18, 2019) under 35 U.S.C. § 371, which claims priority to Japanese Patent Application No. 2018-125899 (filed on Jul. 2, 2018), which are all hereby incorporated by reference in their entirety.

TECHNICAL FIELD

The present technology relates to an information processing apparatus, an information processing method, and an information processing apparatus-readable recording medium.

BACKGROUND ART

In recent years, in order to provide a user with a more varied sense of presence, a technique of incorporating an actuator or the like in an input device that operates content of a game or the like and providing a tactile stimulation such as vibration to a user holding the input device has been used (for example, see Patent Literature 1).

CITATION LIST

Patent Literature

Patent Literature 1: Japanese Patent Application Laid-open No. 2015-231098

DISCLOSURE OF INVENTION

Technical Problem

For example, even when a game user uses headphones for listening to background music of a game in order to prevent the sound from leaking to the surroundings when controlling game content or the like, a sound caused by vibration of an actuator that vibrates an input device may cause discomfort to a person around the game user.

In view of the above-mentioned circumstances, it is an object of the present technology to provide an information processing apparatus, an information processing method, and an information processing apparatus-readable recording medium that are capable of adjusting a sound caused by vibration of a vibration output unit that vibrates an input device in accordance with the surrounding situation of a game user.

Solution to Problem

In order to accomplish the above-mentioned object, an information processing apparatus according to an embodiment of the present technology includes a vibration control unit.

The vibration control unit controls vibration of a vibration output unit to change a sound caused by the vibration of the vibration output unit on the basis of surrounding environment information of an input device including a vibration output unit, the input device being held by a user.

With such a configuration, the sound from the input device caused by the vibration can be changed in accordance with the surrounding environment, and thus it is, for example, possible to reduce discomfort due to the sound from the input device to a person around the user holding the input device.

The environment information may be information associated with a person around the input device.

The information associated with the person may include attribute information of the person.

The information associated with the person may include action information of the person.

Accordingly, the vibration of the vibration output unit can be controlled on the basis of the information associated with the surrounding person, and a situation suitable to each surrounding person can be made.

The vibration control unit may control the vibration of the vibration output unit to damp the vibration of the vibration output unit on the basis of the environment information.

The information processing apparatus or an electronic apparatus that connects to the information processing apparatus may be configured such that an audio output apparatus is connectable to the information processing apparatus or the electronic apparatus, and the environment information may include information about a connection state of the audio output apparatus.

With such a configuration, the vibration of the vibration output unit can be controlled to change the sound caused by the vibration of the vibration output unit by the use of connection/disconnection information of the audio output apparatus such as headphones and a speaker.

The environment information may include information that is obtained by a sensing device mounted on the input device or an apparatus different from the input device.

The sensing device may include at least one of an audio obtaining device that collects ambient sounds, an image obtaining device that captures an image of a periphery of the input device, position information obtaining device that detects position information, an acceleration information obtaining device that detects acceleration information, or a direction information obtaining device that detects direction information.

Accordingly, the ambient sound information, the surrounding image information, the position information of the apparatus on which the sensing device is mounted, the acceleration information of the apparatus on which the sensing device is mounted, or the direction information of the apparatus on which the sensing device is mounted can be acquired as the environment information.

The vibration control unit may control the vibration of the vibration output unit on the basis of an audible level of the sound caused by the vibration output unit, the audible level being set by the user.

By the audible level being set by the user as above, the input device can make a situation according to the surrounding environment while presenting a vibration according to the user's wish.

The vibration control unit may control the vibration of the vibration output unit on the basis of the environment information and information associated with the input device.

The information associated with the input device may be a natural frequency of a casing constituting the input device.

With such a configuration, the vibration of the vibration output unit can be controlled to reduce resonance frequency components on the basis of the natural frequency of the casing of the input device.

The vibration may have a first frequency band and a second frequency band having a frequency higher than a frequency of the first frequency band, and the vibration control unit may partially or entirely cut components in the second frequency band and control the vibration of the vibration output unit on the basis of the environment information.

With such a configuration, the sound caused by the vibration of the vibration output unit can be reduced by partially or entirely cutting the sound in the second frequency band. At the same time, since the vibration in the first frequency band is not cut, the vibration can be presented to the user.

The vibration control unit may control the vibration of the vibration output unit through a low pass filter.

In order to accomplish the above-mentioned object, an information processing method according to an embodiment of the present technology includes controlling vibration of a vibration output unit to change a sound caused by the vibration of the vibration output unit on the basis of surrounding environment information of an input device including a vibration output unit, the input device being held by a user.

In order to accomplish the above-mentioned object, a non-transitory information processing apparatus-readable recording medium according to an embodiment of the present technology records a program for causing an information processing apparatus to execute processing including the step of controlling vibration of a vibration output unit to change a sound caused by the vibration of the vibration output unit on the basis of surrounding environment information of an input device including a vibration output unit, the input device being held by a user.

Advantageous Effects of Invention

As described above, in accordance with the present technology, it is possible to change a sound caused by vibration of a vibration output unit in accordance with the surrounding environment. It should be noted that the effects described here are not necessarily limitative, and any of the effects described in the present disclosure may be provided.

BRIEF DESCRIPTION OF DRAWINGS

FIG. 5 An example of a look-up table used for determining a control pattern of the sounding prevention control.

FIG. 6 An example of a table used for determining the control pattern of the sounding prevention control.

MODE(S) FOR CARRYING OUT THE INVENTION

Hereinafter, an information processing system including a game console main body as an information processing apparatus according to an embodiment of the present technology will be described with reference to the drawings.

First Embodiment

Figure 1:
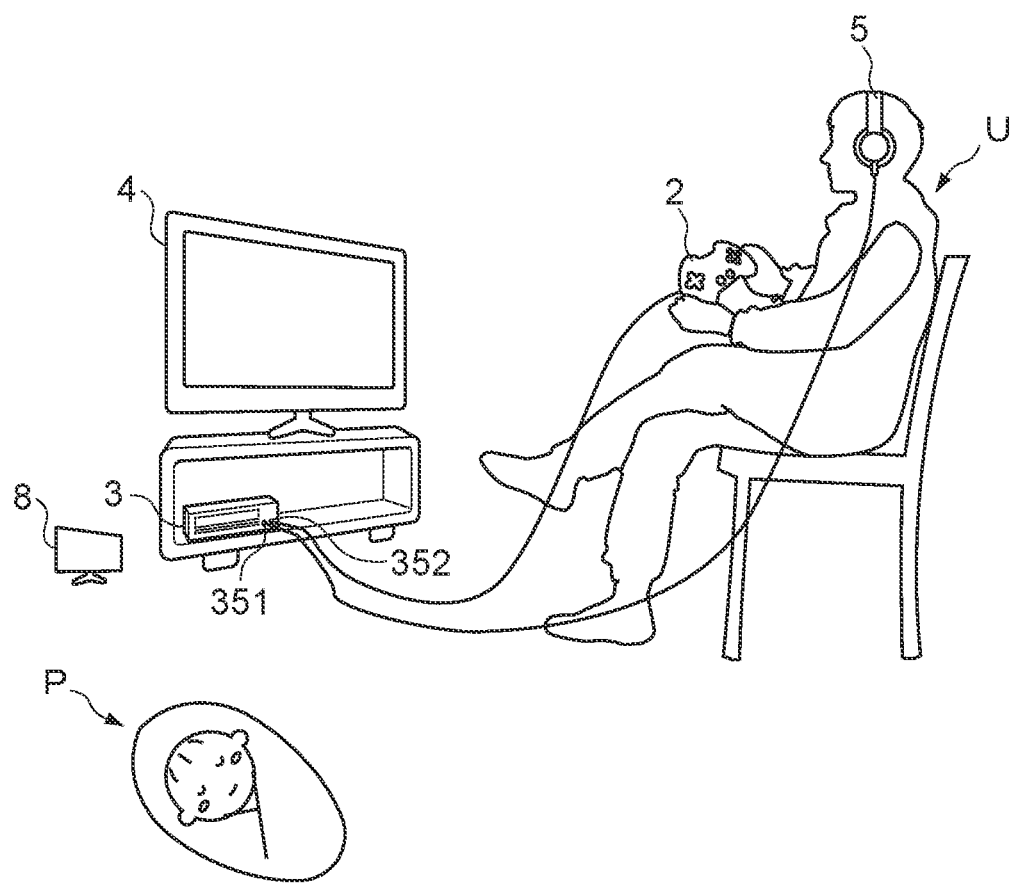
FIG. 1 A diagram showing a state in which a user performs a game operation using a game console main body as an information processing apparatus according to a first embodiment of the present technology.
Figure 2:
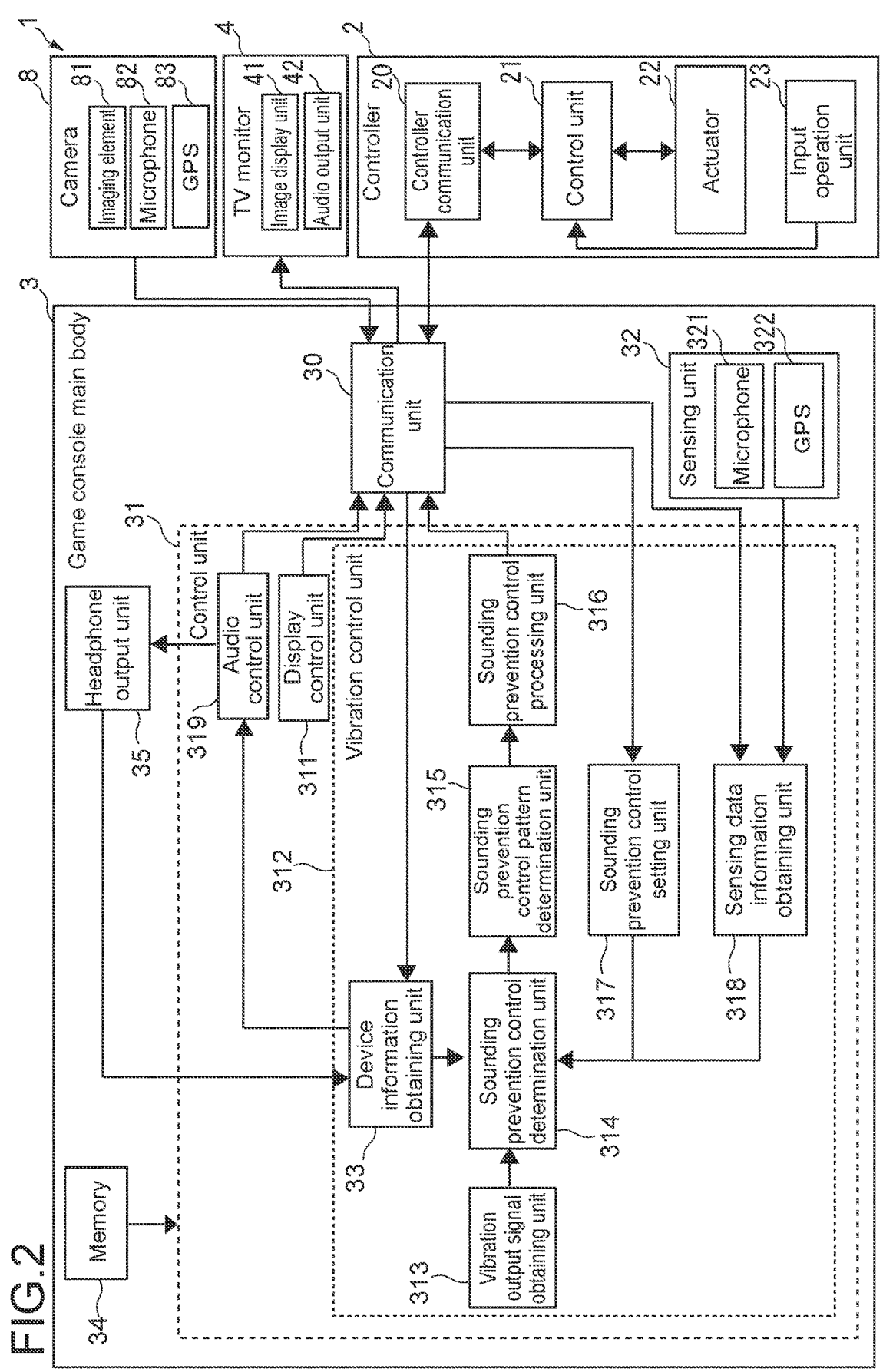
FIG. 2 A functional block diagram showing a configuration example of an information processing system including the game console main body.

FIG. 1 is a diagram showing a state in which a user U operates a game console main body 3 according to this embodiment in a house. FIG. 2 is a functional block diagram showing a configuration example of an information processing system 1 including the game console main body 3.

[Schematic Configuration of Information Processing System]

As shown in FIGS. 1 and 2, the information processing system 1 includes a game console main body 3 as an information processing apparatus, a controller 2 as an input device, and a camera 8. The game console main body 3 is configured to be capable of reproducing a game program installed and stored in advance in a replaceable information recording medium mounted thereon. Alternatively, the game console main body 3 may be configured to be capable of reproducing a game program received from another device.

The game console main body 3 is connected to a television (TV) monitor 4 as a display device. The controller 2 is configured to be capable of being held by the user U and is connected to the game console main body 3 with a wire or wirelessly. The controller 2 may be singular or plural.

The user U can proceed with a game by input operations using the controller 2 while viewing a game image displayed on the TV monitor 4 by the game console main body 3 reading and executing the game program.

The camera 8 is connected to the game console main body 3 with a wire or wirelessly. The camera 8 can be set at an arbitrary position by the user U and is typically set at a position at which camera 8 can capture an image of the periphery of the user U holding the controller 2.

The game console main body 3 includes a headphone terminal 351 into/from which a plug of a cord end of headphones 5 as an audio output apparatus can be inserted and removed and a controller terminal 352 into/from which a plug of a cord end of the controller 2 can be inserted and removed.

By connecting the headphones 5 to the game console main body 3 to prevent background music of the game from leaking to the surroundings, the user U can proceed with the game to prevent a person around the user U, for example, a sleeping baby P from being awaken by the background music and the like of the game.

The headphones 5 have ear pads provided covering both ears and is equipped with speakers as sound emitting units close to the ears. The headphones 5 are connected to the game console main body 3 by the plug of the headphones 5 being inserted into the headphone terminal 351, and the connection is cancelled by the plug of the headphones 5 being removed from the headphone terminal 351.

The controller 2 is equipped with an actuator 22 as a vibration output unit that provides vibration such that a sense of presence of the game can be provided to the user. Even when the headphones 5 are used to prevent the background music of the game from leaking to the surroundings, a sound caused by vibration of the actuator 22 may be generated from the controller 2. The present technology suppresses such sounding from the controller 2 in accordance with the surrounding situation, and each configuration will be described below in detail.

[Detailed Configuration of Each Configuration]
(TV Monitor)

As shown in FIG. 2, the TV monitor 4 includes an image display unit 41 and an audio output unit 42. The TV monitor 4 receives an image display signal and an audio signal associated with the game from the game console main body 3, and displays images on the image display unit 41, and outputs a sound from the audio output unit 42. Further, the TV monitor 4 receives the image display signal associated with an environment setting screen relating to the sounding of the controller 2 from the game console main body 3, and displays it on the image display unit 41.

(Camera)

The camera 8 includes, as sensing devices, an imaging element 81 as an image obtaining device, a microphone 82 as a voice obtaining device, and a GPS receiver 83 as a position information obtaining device. These sensing devices obtain environment information of the user U holding the controller 2 and the surroundings of the user U (hereinafter, simply referred to as environment information in some cases).

The imaging element 81 captures an image of the user U holding the controller 2 and the surroundings, for example. The captured surrounding image information is output to the game console main body 3 as environment information.

The microphone 82 collects sounds around the camera 8. The collected first ambient sound information is output to the game console main body 3 as environment information.

The GPS receiver 83 receives radio waves from a GPS satellite, detects the position of the camera 8, and outputs the detected position information of the camera 8 to the game console main body 3 as environment information.

(Controller)

The controller 2 includes a controller communication unit 20, a control unit 21, the actuator 22, and an input operation unit 23. The controller 2 and the game console main body 3 are connected to each other wirelessly or with a wire. The controller communication unit 20 communicates with the game console main body 3.

The control unit 21 causes the controller communication unit 20 to transmit operation information input by using the input operation unit 23 and information associated with the controller 2 to the game console main body 3. The information associated with the controller 2 is specification information of the controller 2 and includes the natural frequency of a casing constituting the controller 2.

Further, the control unit 21 drives the actuator 22 on the basis of vibration control information transmitted from the game console main body 3 via the controller communication unit 20.

The actuator 22 drives on the basis of the vibration control information generated by the game console main body 3. The actuator 22 is a vibration device that provides a predetermined vibration to the controller 2. The provision of the actuator 22 makes it possible to provide vibration to the user holding the controller 2. In this manner, the provision of vibration from the controller 2 provides the user with a sense of presence depending on content.

A voice coil motor (VCM), a linear resonant actuator (LRA), or the like that can provide acceleration at relatively high frequencies, e.g., 200 Hz or more, can be used for the actuator 22. Since those devices can provide acceleration at relatively high frequencies, a more varied sense of presence can be provided to the user.

Here, even if the user U wears the headphones 5 to prevent the background music of the game from leaking to the surroundings, a sound caused by vibration of the actuator 22 (hereinafter, simply referred to as sounding in some cases) may be generated from the controller 2. This sounding may be perceived as an uncomfortable sound by some people around the user U.

In this embodiment, the surrounding situation of the game user is determined using sensing data of the sensing devices, and the driving of the actuator 22 is controlled so as to change the sounding in accordance with the surrounding situation. The sensing devices are mounted on the game console main body 3 or the camera 8 that is a device different from the controller 2. In this embodiment, a reduction in the sounding is exemplified as a change in the sounding.

The above-mentioned sounding includes a sound generated by resonance in which the frequency of the vibration received by the casing constituting the controller 2 from the actuator 22 is identical to the natural frequency of the casing in addition to a driving sound of the actuator 22.

The input operation unit 23 is disposed on a casing surface constituting the outer shape of the controller 2. The input operation unit 23 includes a direction indication key, an operation button unit, and the like. When an electrical signal corresponding to an input from the input operation unit 23 is input, the control unit 21 transmits an operation signal corresponding to the user's operation to the game console main body 3 via the controller communication unit 20.

The input operation unit 23 is capable of performing input operations related to selection of environment settings of the controller 2 in addition to input operations related to the progress of the game. For example, in this embodiment, the user can select which level the audible level is on the environment setting screen before starting the game.

For example, the environment setting screen for selecting one of three set levels of "high audible level", "medium audible level", and "low audible level" is displayed on the TV monitor 4. The user can select a degree of sounding, in other words, the audible level through the controller 2 while viewing this environment setting screen.

The control unit 21 transmits setting information of the audible level set by the user's input operation as controller environment setting information to the game console main body 3 via the controller communication unit 20.

The game console main body 3 generates vibration control information of the actuator 22 for controlling the vibration of the actuator 22 on the basis of the received audible level information and the environment information, and transmits the generated vibration control information to the controller 2. The controller 2 drives the actuator 22 on the basis of this vibration control information. Details of the game console main body 3 will be described later.

When the "high audible level" is selected on the environment setting screen, the sounding prevention control is turned off, such that the sounding prevention control of the controller 2 is not performed irrespective of the surrounding environment. In this case, the sound caused by vibration of the actuator 22 from the controller 2 will be sounded without being reduced. The actuator 22 is driven on the basis of a vibration output signal preset in the game program.

When the "medium audible level" is selected on the environment setting screen, the sounding prevention control is turned on, such that the degree of sounding is controlled in accordance with the environment information. The actuator 22 is driven on the basis of the vibration control information obtained by performing sounding prevention control processing according to the environment information on the vibration output signal.

When the "low audible level" is selected on the environment setting screen, the sounding prevention control is turned on, such that control is performed to mute the sound of the controller 2 irrespective of the surrounding environment of the user. The actuator 22 is driven on the basis of the vibration control information obtained by performing sounding prevention control processing on the vibration output signal.

Figure 4:
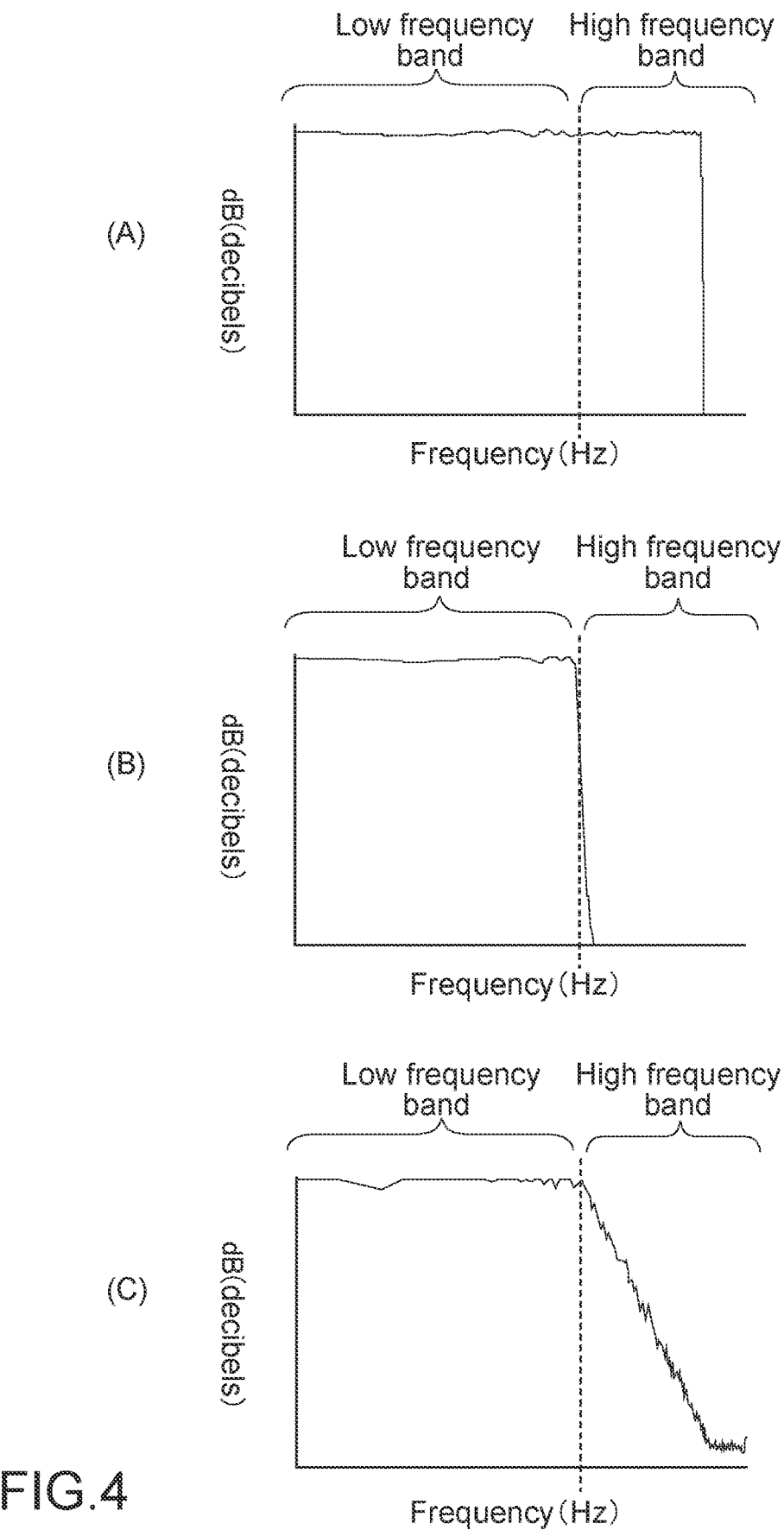
FIG. 4 A diagram for describing an example of sounding prevention control for a sound caused by vibration of an actuator.

Each graph of FIG. 4 shows an example of the sound emitted from the controller 2, with the horizontal axis indicating a frequency and the vertical axis indicating a sound pressure level (decibels).

FIG. 4(A) shows an example of the sound emitted from the controller 2 when the "high audible level" is selected. When the "high audible level" is selected, the sounding prevention control processing is not performed, and the sound in the high frequency band is also output.

FIG. 4(B) shows an example of the sound emitted from the controller 2 when the "low audible level" is selected. When the "audible level low" is selected, the sounding prevention control is turned on, such that the sounding prevention control processing to cut substantially all the sound in the high frequency band is performed.

FIG. 4(C) shows an example of the sound emitted from the controller 2 when the "medium audible level" is selected. When the "medium audible level" is selected, the sounding prevention control is turned on, such that how to cut the sound in the high frequency band varies in accordance with the environment information.

For example, even when the "medium audible level" is selected, substantially all the sound in the high frequency band are cut as shown in FIG. 4(B) in a case where it is determined to perform processing of cutting substantially all the sound in the high frequency band on the basis of the environment information.

Further, even when the "medium audible level" is selected, the sound in the high frequency band is partially cut as shown in FIG. 4(C) in a case where it is determined to perform processing of partially cutting the sound in the high frequency band, not entirely cutting the sound in the high frequency band on the basis of the environment information.

In the example shown in FIG. 4(C), the cutting is performed such that the amount of cutting increases continuously as the frequency increases in the high frequency band. In the case of partial cutting, the degree of cutting depends on the environment information.

(Game Console Main Body)

The game console main body 3 includes a communication unit 30, a control unit 31, a sensing unit 32, a memory 34, and a headphone output unit 35.

The memory 34 includes a memory device such as a RAM and a non-volatile recording medium such as a hard disk drive, and records a game program executed by the control unit 31, a sounding prevention control program, and the like.

The memory 34 is a non-transitory information processing apparatus-readable recording medium for recording the sounding prevention control program for causing a vibration control unit 312 (to be described later) of the game console main body 3 as the information processing apparatus to execute sounding prevention control.

The communication unit 30 communicates with the camera 8, the TV monitor 4, the controller 2, and the like. The communication unit 30 transmits the surrounding image information, the first ambient sound information, and the position information of the camera 8, which have been received from the camera 8 to a sensing data information obtaining unit 318 (to be described later) of the control unit 31.

The communication unit 30 transmits the image display signal and the audio signal associated with the TV monitor 4, which have been transmitted respectively from an audio control unit 319 and a display control unit 311, to the TV monitor 4.

The communication unit 30 transmits the specification information and the input operation information of the controller 2, which have been received from the controller 2, to a device information obtaining unit 33 and a sounding prevention control setting unit 317, respectively. The communication unit 30 transmits the vibration control information generated by the control unit 31 to the controller 2.

Audio signals of the background music and the like of the game are selectively output to the audio output unit 42 of the TV monitor 4 and the headphone output unit 35.

The sensing unit 32 includes, as sensing devices, a microphone 321 as a voice obtaining device and a GPS receiver 322 as a position obtaining device. The user U holding the controller 2 which is a vibration generating source is assumed to be close to the game console main body 3, and the microphone 321 obtains second ambient sound information as surrounding environment information of the controller 2. The obtained second ambient sound information is transmitted to the sensing data information obtaining unit 318.

The GPS receiver 322 receives the radio waves from the GPS satellite to detect the position of the game console main body 3. The GPS receiver 322 outputs the position information of the game console main body 3 detected as the environment information to the sensing data information obtaining unit 318.

The control unit 31 proceeds with the game on the basis of the operation signal according to the input operation contents by the controller 2 and the game program. Further, the control unit 31 controls the sounding of the controller 2, which is caused by vibration of the actuator 22, on the basis of the sounding prevention control program.

Specifically, the control unit 31 displays an image on the TV monitor 4 in accordance with the progress of the game and generates, on the basis of the sounding prevention control program, vibration control information for controlling the vibration of the actuator 22 to reduce the sounding of the controller 2 in accordance with the surrounding environment. The generated vibration control information is transmitted to the controller 2 via the communication unit 30. The controller 2 drives the actuator 22 on the basis of the received vibration control information.

Hereinafter, the control unit 31 will be described in detail. As shown in FIG. 2, the control unit 31 includes the display control unit 311, the audio control unit 319, and the vibration control unit 312. The vibration control unit 312 performs processing based on the sounding prevention control program. The vibration control unit 312 controls the vibration of the actuator 22 to change the sound caused by vibration of the actuator 22.

The display control unit 311 controls an image to be displayed on the TV monitor 4. The display control unit 311 transmits the image display signal based on the game program to the TV monitor 4 via the communication unit 30.

Further, the display control unit 311 transmits the image display signal of the environment setting screen relating to the sounding of the controller 2 to the TV monitor 4 via the communication unit 30. The environment setting screen is a user operation screen on which the user selects and sets the audible level of the sounding from the controller 2. As described above, the three options of the high audible level, the medium audible level, and the low audible level are displayed on the environment setting screen of this embodiment.

The audio control unit 319 transmits the audio signal based on the game program to the headphone output unit 35 or the audio output unit 42 of the TV monitor 4 on the basis of the insertion/removal information of the headphones 5 from the device information obtaining unit 33.

When the plug of the cord end of the headphones 5 is inserted into the headphone terminal 351 and the game console main body 3 and the headphones 5 are connected, the audio signal is output to the headphone output unit 35. The audio signal output to the headphone output unit 35 is output to the headphone terminal 351.

When the plug of the headphones 5 to the headphone terminal 351 is removed and the game console main body 3 and the headphones 5 are disconnected, the audio signal is output to the audio output unit 42 of the TV monitor 4.

The vibration control unit 312 includes the device information obtaining unit 33, the sounding prevention control setting unit 317, the sensing data information obtaining unit 318, a vibration output signal obtaining unit 313, a sounding prevention control determination unit 314, a sounding prevention control pattern determination unit 315, and a sounding prevention control processing unit 316.

The device information obtaining unit 33 obtains plug insertion/removal information of the headphones 5 from the headphone output unit 35. The device information obtaining unit 33 obtains the specification information of the controller 2 from the controller 2 through the communication unit 30.

The device information obtaining unit 33 transmits the insertion/removal information of the headphones 5, in other words, connection/disconnection information of the headphones 5 to the audio control unit 319. The device information obtaining unit 33 transmits the insertion/removal information of the headphones 5 and the specification information of the controller 2 to the sounding prevention control determination unit 314.

The sounding prevention control setting unit 317 obtains the setting information of the audible level set by the user U, and transmits the obtained setting information to the sounding prevention control determination unit 314.

The sensing data information obtaining unit 318 obtains sensing data information detected by each of the plurality of sensing devices. The sensing data information is the environment information. Specifically, the surrounding image information, the first ambient sound information, and the position information of the camera 8 are obtained from the camera 8, and the second ambient sound information and the position information of the game console main body 3 are obtained from the sensing unit 32, as the sensing data information.

The environment information is the surrounding environment information of the controller 22 that is the input device. The environment information includes insertion/removal information relating to the connection state of the headphones, the surrounding situation obtained based on the sensing data information, and the like in addition to the sensing data information obtained from the sensing devices described above. The surrounding situation includes information about a person around the controller 2, and the like. The information related to the person around the controller 2 includes distance information between the controller 2 and the person, attribute information of the person, action information of the person, and the like. The attribute information of the person is gender, age, and the like. The action information of the person is reading, sleeping, listening to music, and the like.

The vibration output signal obtaining unit 313 obtains the vibration output signal preset in the game program from the memory 34. This vibration output signal is a signal that is output in a normal state in which the sounding prevention control processing is not performed.

The vibration of the actuator 22 driven in accordance with the vibration output signal has a first frequency band and a second frequency band. The second frequency band has a frequency higher than that of the first frequency band.

Here, a frequency band having a frequency lower than 100 Hz is defined as the first frequency band (low frequency band), and a frequency band having a frequency equal to or higher than 100 Hz is defined as the second frequency band (high frequency band), though not limited thereto. In general, the lower limit of the human audible band is about 20 Hz and the upper limit of the human audible band is approximately 15 KHz to 20 KHz, where 100 Hz is defined as a criteria for dividing the high and low frequency bands.

The sounding prevention control determination unit 314 obtains the vibration output signal from the vibration output signal obtaining unit 313 and obtains the surrounding image information, the first ambient sound information, the position information of the camera 8, the second ambient sound information, and the position information of the game console main body 3 from the sensing data information obtaining unit 318. Further, the sounding prevention control determination unit 314 obtains audible level setting information from the sounding prevention control setting unit 317 and obtains the insertion/removal information of the headphones 5 and the specification information of the controller 2 from the device information obtaining unit 33.

The sounding prevention control determination unit 314 determines the necessity of the sounding prevention control on the basis of the obtained information. Specifically, when obtaining information indicating that the plug of the headphones 5 has been removed from the game console main body 3, the sounding prevention control determination unit 314 determines that the sounding prevention control is unnecessary. It is because the condition that the plug of the headphones 5 has been removed from the game console main body 3 is considered as an environment in which it is unnecessary to prevent sound leakage to the surroundings.

When obtaining the information indicating that the headphones 5 is inserted into the game console main body 3 and obtaining the setting information indicating the "high audible level", the sounding prevention control determination unit 314 determines that the sounding prevention control is unnecessary.

When obtaining the information indicating that the headphones 5 is inserted into the game console main body 3 and obtaining the setting information indicating the "low audible level", the sounding prevention control determination unit 314 determines that the sounding prevention control is necessary. Further, the sounding prevention control determination unit 314 determines that the sounding prevention control is necessary to constantly cut all sound components in the high frequency band of the sound emitted from the controller 2 and further cut resonance wavelength components of the controller 2 irrespective of the information contents of the sensing data information.

When obtaining the information indicating that the headphones 5 are inserted into the game console main body 3 and obtaining the setting information indicating the "medium audible level", the sounding prevention control determination unit 314 determines that the sounding prevention control is necessary. Further, on the basis of the sensing data information, the sounding prevention control determination unit 314 determines that the sounding prevention control according to the surrounding environment is necessary.

The sounding prevention control pattern determination unit 315 determines a control pattern used for the sounding prevention control processing on the basis of the device information and the sensing data information. In this embodiment, three control patterns are prepared. A specific example of determining the control patterns will be described later.

The sounding prevention control processing unit 316 generates vibration control information for controlling the vibration of the actuator 22 on the basis of the vibration output signal obtained by the vibration output signal obtaining unit 313, the determination result of the sounding prevention control determination unit 314, and the control pattern determined by the sounding prevention control pattern determination unit 315. The generated vibration control information is transmitted to the controller 2 via the communication unit 30.

The sounding prevention control processing unit 316 has a low-pass filter. The low-pass filter cuts high frequency band components of the vibration output signal obtained from the vibration output signal obtaining unit 313 on the basis of the control pattern and generates vibration control information to damp the vibration. The low-pass filter also cuts the resonance wavelength components of the controller 2 when the sounding prevention control is on.

Specifically, in a case where sounding prevention control determination unit 314 determines that the sounding prevention control is unnecessary, the sounding prevention control processing unit 316 generates a vibration output signal not subjected to the sounding prevention control processing, as the vibration control information.

In a case where the sounding prevention control determination unit 314 determines that the sounding prevention control to constantly cut all sound components in the high frequency band of the sound emitted from the controller 2 is necessary, the sounding prevention control processing unit 316 generates vibration control information to cut all high frequency band components of the sound emitted from the controller 2 and cut the resonance wavelength components of the controller 2.

In a case where the sounding prevention control determination unit 314 determines that the sounding prevention control according to the surrounding situation is necessary, the sounding prevention control processing unit 316 generates vibration control information not to perform the sounding prevention control processing in accordance with the surrounding situation or to cut all or some of the high frequency band components of the sound emitted from the controller 2 and cut the resonance wavelength components of the controller 2.

By controlling the driving of the actuator 22 to partially or entirely cut the high frequency band components of the sound emitted from the controller 2, it is possible to suppress the sounding from the controller 2.

With this configuration, even in an environment in which, for example, the sleeping baby is present around the user U, the vibration of the actuator 22 is controlled on the basis of the environment information indicating that the sleeping baby is present around the user U, such that it is possible to lower the possibility that the baby P may be awaken by the sounding from the controller 2. In this manner, it is possible to suppress the generation of discomfort due to the sounding in the person or the like around the user. Further, since the vibration of the controller 2 is not completely lost, it is possible to provide the user with a sense of presence according to the content.

(Sounding Prevention Control Method)

Figure 3:
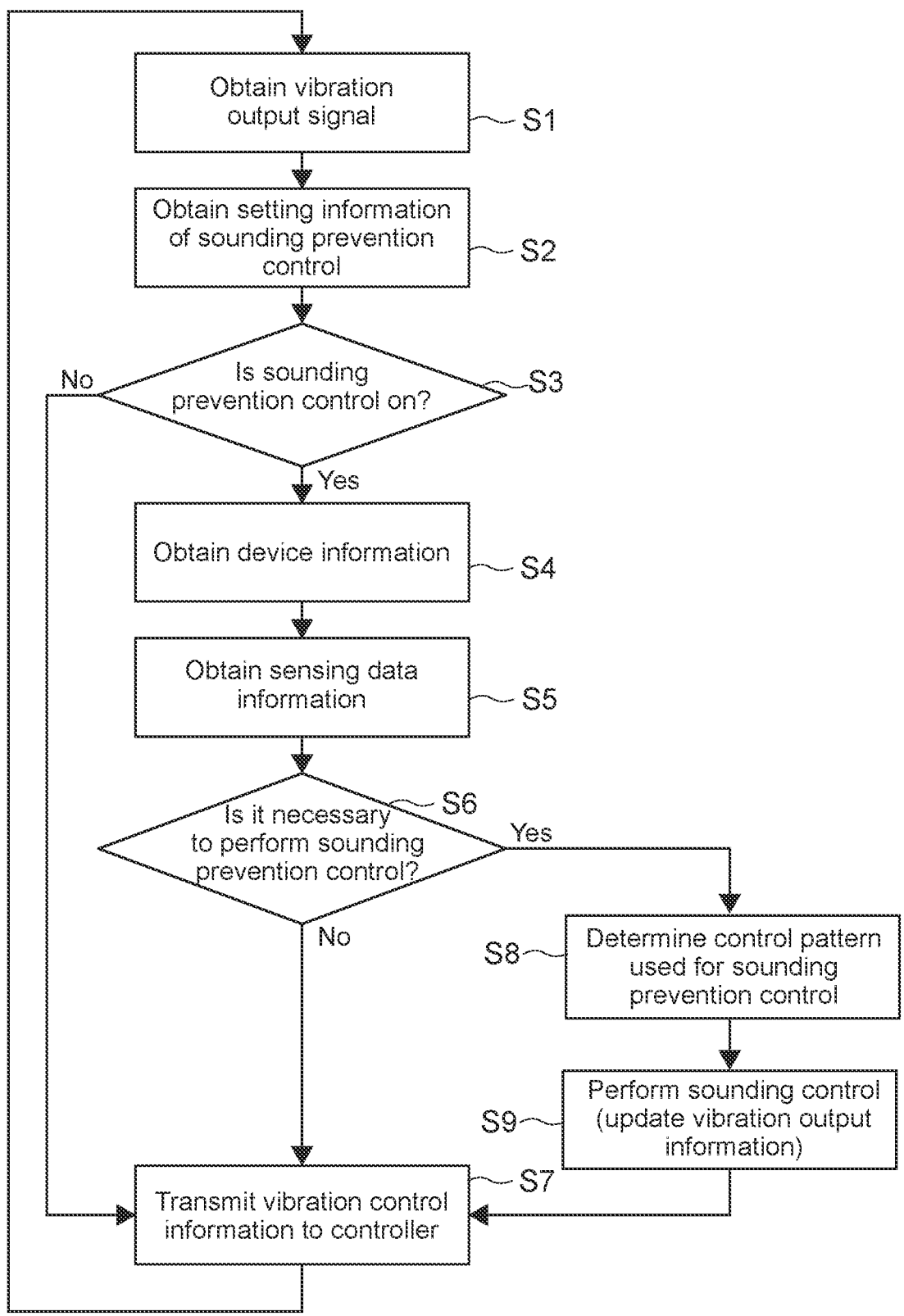
FIG. 3 A flowchart describing an information processing method associated with sounding prevention control in the game console main body.

Next, an information processing method relating to the sounding prevention control will be described with reference to FIGS. 2 and 3. FIG. 3 is a flowchart of the sounding prevention control method and the description will be given on the basis of this flowchart.

First, the vibration output signal obtaining unit 313 obtains the vibration output signal (S1). Next, in Step S2, the sounding prevention control determination unit 314 obtains the setting information of the audible level from the sounding prevention control setting unit 317 (S1).

Next, in Step S3, the sounding prevention control determination unit 314 determines whether or not the sounding prevention control is on the basis of the setting information. In a case where it is determined that the sounding prevention control is off, the processing proceeds to S7. In a case where it is determined that the sounding prevention control is on, the processing proceeds to S4.

In a case where it is determined that the sound prevention is on, the sounding prevention control determination unit 314 obtains, from the device information obtaining unit 33, the device information such as the insertion/removal information of the headphones 5 and natural vibration information of the controller 2 (S4).

Next, in Step S5, the sounding prevention control determination unit 314 obtains the sensing data information from the sensing data information obtaining unit 318.

Next, in Step S6, the sounding prevention control determination unit 314 determines whether or not it is necessary to perform the sounding prevention control. When the information indicating that the plug of the headphones 5 has been inserted is obtained, it is determined that it is necessary to perform the sounding prevention control, and the processing proceeds to S8. On the other hand, when the information indicating that the plug of the headphones 5 has been removed is obtained, it is determined that it is unnecessary to perform the sounding prevention control, and the processing proceeds to S7.

In a case where it is determined in S3 and S6 that it is unnecessary to perform the sounding prevention control, the sounding prevention control processing unit 316 transmits the vibration output signal not subjected to the sounding prevention control processing as the vibration control information to the controller 2 via the communication unit 30 (S7).

In S8, the sounding prevention control pattern determination unit 315 determines the control pattern used for the sounding prevention control processing on the basis of the audible level setting information and the sensing data information in Step S8. Details of the method of determining the control pattern will be described later.

The sounding prevention control processing unit 316 performs the sounding prevention control processing on the vibration output signal on the basis of the control pattern of the sounding prevention control determined in S8 and generates the vibration control information (S9). In Step S7, the generated vibration control information is transmitted to the controller 2 via the communication unit 30. The above-mentioned processing is repeatedly performed.

(Method of Determining Control Pattern Used for Sound Prevention Control Processing)

Next, an example of the method of determining the control pattern described above will be described, though not limited to the example described herein. Further, although an example in which the three control patterns A to C are used will be described in this embodiment, the number of patterns is not limited thereto, and the larger the number of patterns, the finer vibration setting according to the surrounding situation becomes possible.

Figure 7:
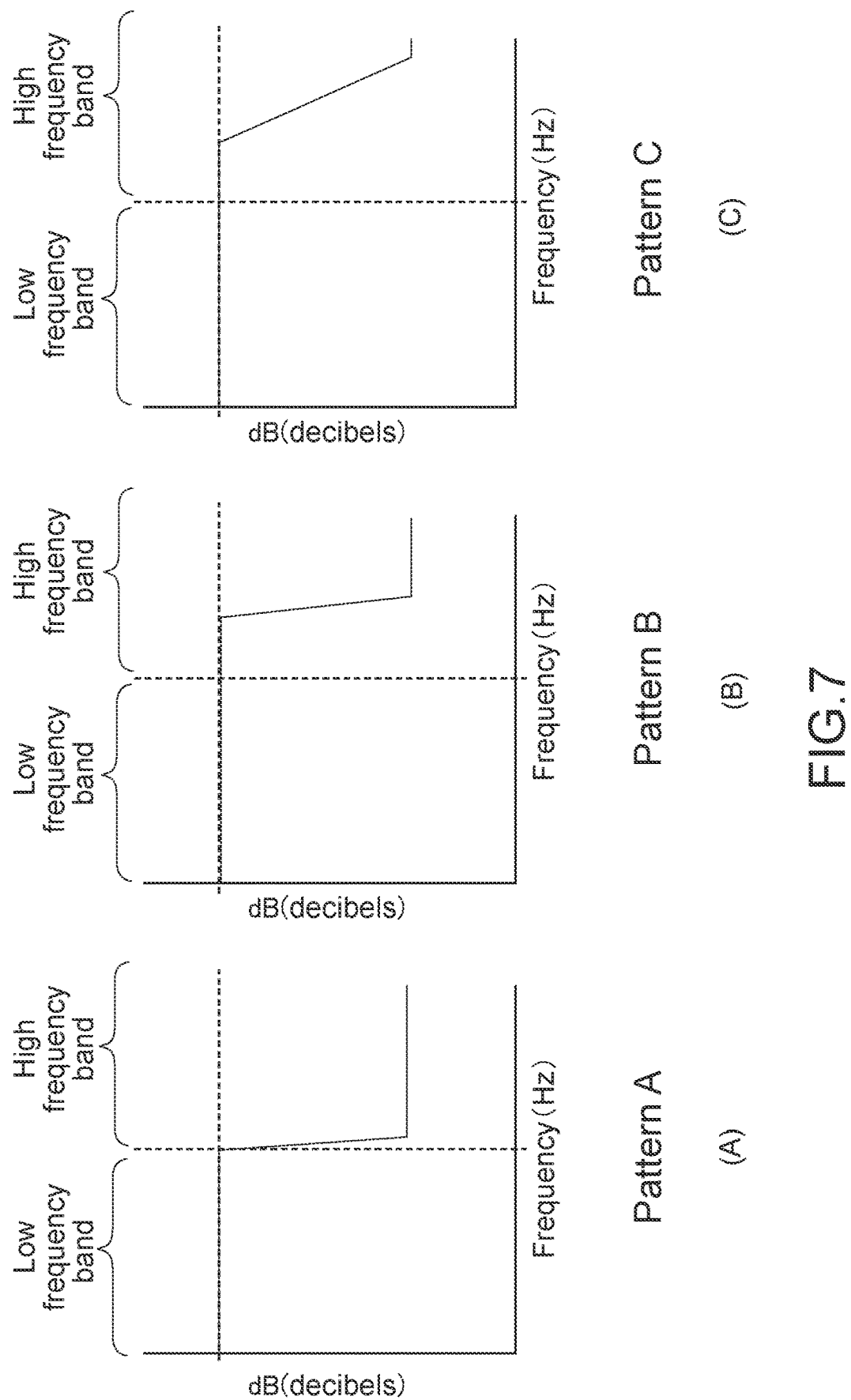
FIG. 7 A diagram for describing a pattern example of the sounding prevention control.

FIG. 7 is a diagram for describing the control patterns for the sound emitted from the controller 2. FIG. 7(A) shows the control pattern A, FIG. 7(B) shows the control pattern B, and FIG. 7(C) shows the control pattern C. In each graph, the horizontal axis indicates a frequency and the vertical axis indicates a sound pressure level (decibels).

The control pattern A is a control pattern used when the "low audible level" is selected. As shown in FIG. 7(A), the control pattern A is for processing of cutting all high frequency band components. With this processing, the generation of the sounding from the controller 2 is substantially avoided while the vibration is provided to the user U. The control pattern A is a control pattern that is also used when the "medium audible level" is selected.

The control pattern A, the control pattern B, and the control pattern C are examples of control patterns used when the "medium audible level" is selected.

As shown in FIG. 7(B), the control pattern B is for processing of partially cutting the high frequency band components, and is a pattern in which the cut components rapidly increases as the frequency becomes higher in the high frequency band components.

With this processing, the sounding from the controller 2 is reduced while the degree of sounding prevention is lower than that of the control pattern A and slight sounding occurs. In this case, it is possible to provide an enhanced sense of presence by vibration to the user U as compared to the control pattern A.

As shown in FIG. 7(C), the control pattern C is for processing of partially cutting the high frequency band components and is a pattern in which cut component gradually increases as the frequency becomes higher in the high frequency band components.

With this processing, the sounding from the controller 2 is reduced while the degree of sound prevention is lower than that of the control pattern B and harder sounding occurs as compared to the control pattern B. In this case, it is possible to more clearly provide a sense of presence by vibration to the user U as compared to the control pattern B.

Thus, in the control patterns A to C, the cut patterns of the high frequency band components are different from each other. It should be noted that when the "high audible level" is selected, the sounding prevention control processing is not performed.

When the "low audible level" is selected, the sounding prevention control pattern determination unit 315 determines to use the control pattern A described above.

When the "medium audible level" is selected, the sounding prevention control pattern determination unit 315 determines the surrounding situation on the basis of the sensing data information, calculates a sounding prevention control value Nv corresponding to the surrounding situation, and determines which control pattern is to be used from the three control patterns of the above-mentioned control patterns A to C on the basis of the sounding prevention control value Nv.

A method of calculating the sounding prevention control value Nv will be described. The sounding prevention control value Nv is calculated on the basis of scores of three surrounding situation parameters. The higher the sounding prevention control value Nv, the higher the possibility that the sound from the controller 2 may be heard as a discomfort sound to the person around the user U.

Here, three pieces of information relating to the person around the user U holding the controller 2 are used as the surrounding situation parameters. Specifically, as parameters of the surrounding situation, used are the three parameters of information about a distance between the controller 2 on which the actuator 22 as the vibration generating source is mounted and the person around the user U holding the controller 2 (hereinafter, referred to as distance information), information about an attribute of the person around the user U (hereinafter, referred to as attribute information of the person), and information about an action of the person around the user U (hereinafter, referred to as action information). It should be noted that here, the examples of the three parameter have been described, though not limited thereto.

The score value related to the parameter of the distance information is denoted by D. The score value related to the parameter of the attribute information of the person is denoted by P. The score value related to the parameter of the action information is denoted by A. The sounding prevention control value Nv is determined by using the following equation. The sounding prevention control value Nv is determined by summing the score values of the respective parameters multiplied by coefficients.

$$Nv = a \cdot D + b \cdot P + c \cdot A \qquad \text{[Formula 1]}$$

Here, a, b, and c indicate coefficients, which are set in advance, and may be arbitrarily changed. These coefficients are used for changing the weighting of each parameter when calculating the sounding prevention control value Nv.

FIG. 5 is a look-up table showing a score for each parameter used for the Nv calculation processing. FIG. 5(A) is a table of the distance information. FIG. 5(B) is a table of the attribute information of the person. FIG. 5(C) is a table of the action information. These look-up tables are prepared in advance.

As shown in FIG. 5(A), the score value is set in accordance with the distance d between the controller 2 and the person around it. In a case where it is determined that the value of the distance d is smaller than 50 cm, the surrounding person is determined as a person participating in the game together with the user U. In this case, it is assumed that there is a low possibility that the sounding from the controller 2 is heard as a discomfort sound to the surrounding person, and the score value is low.

On the other hand, in a case where it is determined that the distance d is 50 cm or more, the surrounding person is not determined as the person participating in the game, and it is assumed that as the value of the distance d becomes larger, it is more difficult for the surrounding person to hear the sound from the controller 2, and the score value becomes lower.

The determination as to whether or not there is a person around the user U holding the controller 2 is performed on the basis of, for example, image recognition using the surrounding image information obtained from the camera 8, the first ambient sound information, and the second ambient sound information from the sensing unit 32. Further, the distance between the user U and the surrounding person is calculated on the basis of the surrounding image information, the position information of the camera 8, and the position information of the game console main body 3.

As shown in FIG. 5(B), the age is exemplified as the attribute information of the person and a score value is set for each different age group. The score value becomes higher with the younger age group, and the score value becomes lower with the older age group. It is because sounds at higher frequencies are, in general, harder to hear for older people, and the score value is set to be lower with the older age group.

The determination of the age of the person around the user U is performed using image recognition on the basis of the surrounding image information obtained from the camera 8. Further, for example, an item indicating whether or not hearing aids are used may be employed as the attribute information of the person in addition to the age. Since even an elderly person can have auditory capacity equivalent to that of middle-aged persons by the use of hearing aids, the score value is set to be relatively high in a case where the use of hearing aids is allowed. Further, an item indicating the gender may be employed as the attribute information of the person. Since females have, in general, greater hearing sensitivity than males for sounds at high frequencies, the score value is set to be relatively high in a case where the person around the user U is feminine.

As shown in FIG. 5(C), the score value is set for each different piece of action information. For example, in a case where it is determined that the surrounding person is reading a book or sleeping, the score value is set to be high, considering that it is highly likely that the surrounding person may feel discomfort about the sound from the controller 2. On the other hand, in a case where it is recognized that the surrounding person is listening to the music through headphones, the score value is set to be low, considering that the person is not in an environment in which the person feels discomfort about ambient sounds with the headphones or the like.

The determination of the action of the user U is performed on the basis of the image recognition based on the surrounding image information obtained from the camera 8, the first ambient sound information, the second ambient sound information from the sensing unit 32, the position information of the camera 8, and the position information of the game console main body 3.

The sounding prevention control pattern determination unit 315 determines the distance information, the attribute information of the person, and the action information on the basis of the sensing data information, obtains score values D, P, and A of the determined information contents with reference to the look-up table, and calculates the sounding prevention control value Nv on the basis of the score values D, P, and A.

The sounding prevention control pattern determination unit 315 determines any control pattern of the three control patterns A to C by the use of the table shown in FIG. 6 on the basis of the calculated sounding prevention control value Nv. It should be noted that although three control patterns are used here, though not limited thereto. FIG. 6 is a table showing a relation between the sounding prevention control value Nv and the patterns A to C.

As shown in FIG. 6, in a case where the value of Nv is equal to or larger than Na, the sounding prevention control pattern determination unit 315 selects the control pattern of the pattern A. In a case where the value of Nv is larger than Nb and smaller than Na, the control pattern of the pattern B is selected. In a case where the value of Nv is equal to or larger than Nv, the control pattern of the pattern C is selected. The values of Na and Nb are set in advance and the relation is Na>Nb.

It should be noted that since the number of control patterns is three as an example in this embodiment, the two thresholds Na and Nb are prepared as the thresholds of Nv for determining the control pattern, but in a case where the number of control patterns is four or more, more thresholds of Nv are prepared.

As described above, since the vibration of the actuator is controlled on the basis of the surrounding environment information of the user U to change the sound caused by vibration of the actuator, it is possible to create a situation suitable for the situation around the user U such as not to awake the sleeping baby P nearby, for example.

Second Embodiment

In the above-mentioned embodiment, the vibration control unit 312 is provided in the game console main body 3, though not limited thereto. The vibration control unit 312 may be provided in the controller or may be provided in the cloud server. In a case where the vibration control unit 312 is provided in the controller 2, the controller 2 serves as the information processing apparatus. In a case where the vibration control unit 312 is provided in the cloud server, the cloud server serves as the information processing apparatus.

Further, the first above-mentioned embodiment exemplifies a stationary game console main body assuming to play a game indoors, but it may also be a portable game console capable of playing a game outdoors. Such a portable game console functions as the display unit and the input device (controller). In this case, the vibration control unit 312 may be in the game console or may be in the cloud server.

Further, a configuration in which a mobile phone such as a smartphone or a tablet terminal is used as a game console may be employed, and the smartphone is typically used.

In this embodiment, a smartphone capable of touch panel operation is configured to be used as a game console, and a case in which the vibration control unit 312 is provided in the cloud server will be exemplified and described with reference to FIG. 8. It should be noted that configurations similar to those in the above-mentioned embodiment will be denoted by similar reference signs and descriptions thereof will be omitted in some cases.

In this embodiment, a smartphone 70 also functions as the input device and an actuator 22 that is a vibration generating source is mounted on the smartphone 70. In the smartphone 70, sounding prevention control is performed to reduce sounding from the smartphone 70 caused by vibration of the actuator 22 when the game is played using the smartphone 70.

With this configuration, even if a user is playing a game in an outdoor space such as a park or on a public vehicle such as a train and bus, for example, it is possible to reduce discomfort caused by sounding to a person around the game user.

Figure 8:
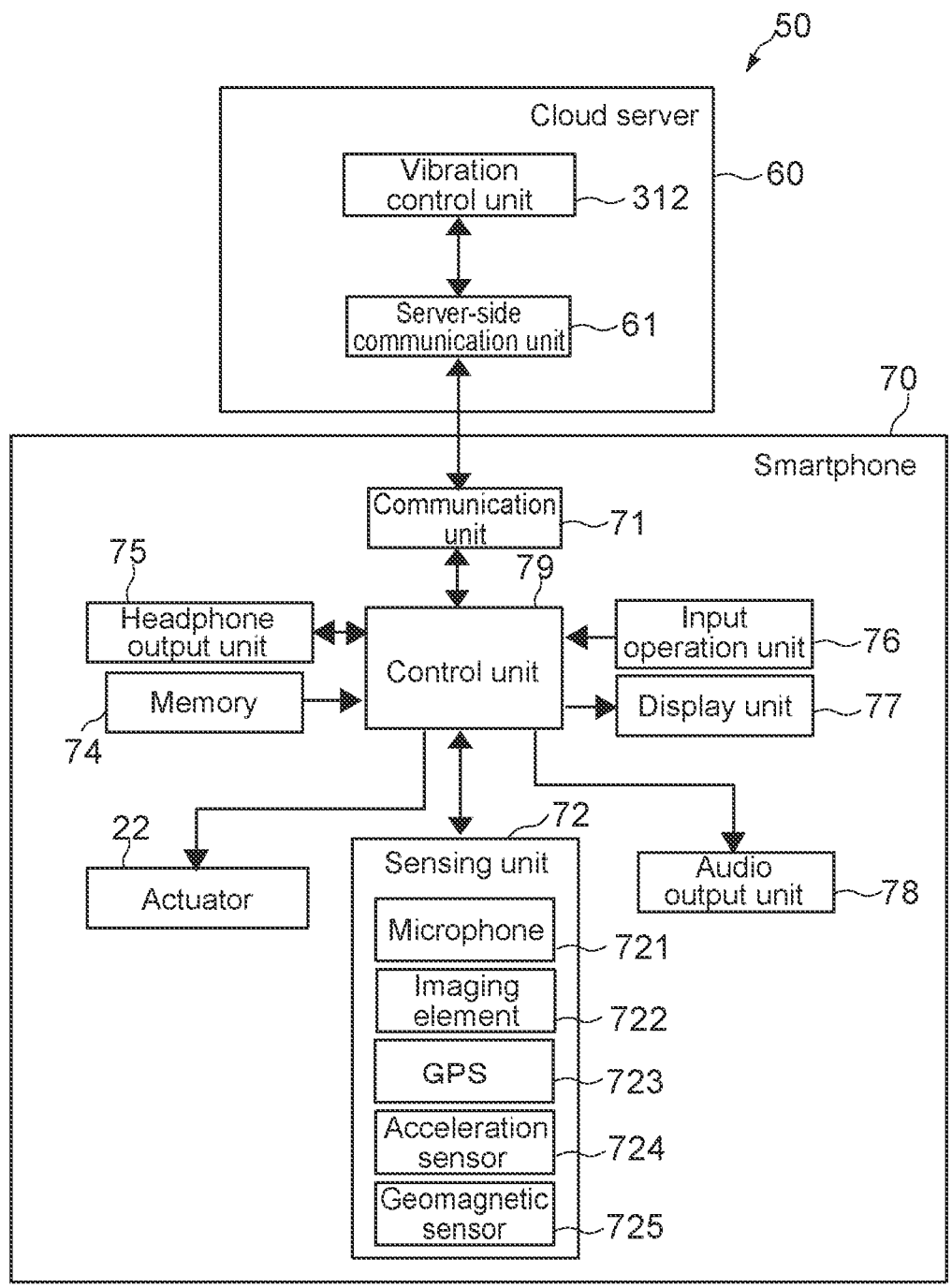
FIG. 8 A functional block diagram showing a configuration example of an information processing system including a cloud server as an information processing apparatus according to a second embodiment.

FIG. 8 shows an information processing system 50 according to this embodiment. The information processing system 50 includes a cloud server 60 as an information processing apparatus and the smartphone 70 as an electronic apparatus that communicates with the information processing apparatus.

The smartphone 70 functions as a game console. The smartphone 70 is configured to display a game image by executing a downloaded game program, output the sound such as background music of the game, and proceed with the game by user's input operations through a touch panel.

The smartphone 70 is provided with a headphone jack into which a plug of headphones can be inserted. The headphones are connected to the smartphone 70 by the plug of the headphones being inserted into the headphone jack, and the headphones are disconnected from the smartphone 70 by the plug of the headphones being removed from the headphone jack.

The cloud server 60 as the information processing apparatus includes a vibration control unit 312, a server-side communication unit 61, and a memory (not shown) in which a program executed by the vibration control unit 312 is stored. The server-side communication unit 61 is configured to be communicable with the smartphone 70.

The vibration control unit 312 has a configuration similar to that of the vibration control unit 312 of the first embodiment. Although the illustration of a detailed functional block diagram of the vibration control unit 312 is omitted here, the descriptions will be given with reference to the configurations of the functional blocks shown in FIG. 2 as necessary.

The vibration control unit 312 obtains a vibration output signal, device information, audible level setting information, and sensing data information from the smartphone 70 through the server-side communication unit 61 and executes sounding prevention control processing on the basis of them in a manner similar to that in the first embodiment to generate vibration control information. The generated vibration control information is transmitted to the smartphone 70 via the server-side communication unit 61.

The smartphone 70 includes a communication unit 71, a control unit 79, an input operation unit 76, a display unit 778, an audio output unit 78, a headphone output unit 75, a memory 74, the actuator 22, and a sensing unit 72.

The communication unit 71 communicates with the cloud server 60 via a wireless network. The display unit 77 displays a game image and an environment setting screen relating to sounding of the smartphone 70 caused by vibration of the actuator 22. The display unit includes, for example, a liquid crystal display and an image display panel such as an organic EL display.

The input operation unit 76 includes keys, buttons, a touch panel, and the like. Also in this embodiment, before starting the game, the environment setting screen is displayed on the display unit 77, and the audible level of the sound from the controller 2 can be selected. The setting information of the audible level selected and set by the user at the input operation unit 76 is transmitted to the control unit 79.

Audio signals of the background music and the like of the game are selectively output to the audio output unit 78 and the headphone output unit 75. When the plug at the end of the cord of the headphones is inserted into the headphone jack, the audio signal is output to the headphone output unit 75. When the plug of the headphones is removed from the headphone jack, the audio signal is output to the audio output unit 78.

The memory 74 stores game programs downloaded in advance by the user, information related to the smartphone 70, and the like. The information related to the smartphone 70 is specification information of the smartphone 70 and includes the natural frequency of the smartphone 70.

The sensing unit 72 includes, as sensing devices, a microphone 721, an imaging element 722, a GPS receiver 723, an acceleration sensor 724 as an acceleration information obtaining device, and a geomagnetic sensor 725 as a direction information obtaining device. Each sensing device obtains various types of sensing data information as environment information.

The microphone 721 collects sounds around the user holding the smartphone 70 and obtains ambient sound information. The imaging element 722 captures an image of the user U and its surroundings and obtains surrounding image information. The GPS receiver 723 detects position information of the smartphone 70. The acceleration sensor 724 detects acceleration information of the smartphone 70. The geomagnetic sensor 725 detects direction information of the smartphone 70.

Based on the detected position information, acceleration information, and direction information of the smartphone 70, it is possible to determine surrounding environment information of the user U which indicates that the user U is moving by public transportation such as a train and a bus, for example. Various types of sensing data information obtained by the sensing unit 72 are transmitted to the control unit 79.

The control unit 79 displays an image on the display unit 77 in accordance with the progress of the game program and outputs a sound from the headphone output unit 75 or the audio output unit 78. Further, the control unit 79 drives the actuator 22 on the basis of the vibration control information received from the cloud server 60.

The control unit 79 causes the display unit 77 to display an environment setting screen relating to the sounding caused by vibration of the actuator 22. The environment setting screen is similar to the first embodiment.

The control unit 79 obtains the insertion/removal information of the headphones from the headphone output unit 75. The control unit 79 obtains the specification information of the smartphone 70 from the memory 74. Further, the control unit 79 obtains sensing data information from the sensing unit 72.

The control unit 79 progresses the game on the basis of the operation signal corresponding to the operation contents received by the user's operation from the touch panel and the reproduced game program. Further, the control unit 79 transmits the vibration output signal, the device information necessary for the sounding prevention control processing for controlling the sound of the smartphone 70, the sensing data information, and the setting information of the sounding prevention control selected by the user to the cloud server 60 via the communication unit 71. The control unit 79 receives the vibration control information generated by the cloud server 60 via the communication unit 71.

The vibration control unit 312 of the cloud server 60 generates vibration control information for controlling the vibration of the actuator 22 such that the sound caused by vibration of the actuator 22 of the smartphone 70 changes in accordance with the surrounding environment on the basis of the sounding prevention control program. The generated vibration control information is transmitted to the smartphone 70 via the server-side communication unit 61.

As described above, in this embodiment, the sensing data information includes acceleration information and direction information. With this configuration, it is possible to determine whether or not the user is moving by a public vehicle such as a train and a bus.

In this embodiment, when the sounding prevention control determination unit 314 of the vibration control unit 312 determines that the user is using the public vehicle on the basis of the sensing data information, the same sounding prevention control processing as that when the low audible level described in the first embodiment is selected is performed irrespective of the contents of the device information and the setting information of the audible level selected by the user.

It should be noted that in a case where it is determined that the user is not using the public vehicle, the sounding prevention control processing is performed on the basis of the device information, the sensing data information, and the audible level setting information selected by the user as in the first embodiment.

Third Embodiment

In the first embodiment, the sounding prevention control is turned on when the medium audible level or the low audible level is selected. That is, in the first embodiment, the two options for the audible level are provided when the sounding prevention control is on. The number of options is not limited thereto, and three or more options may be provided. In a third embodiment, a sounding prevention control method in a case where three options for the sounding prevention control level are provided when the sounding prevention control is on will be described.

In the first embodiment, when the high audible level is selected, the sounding prevention control is not performed, and when the low audible level is selected, processing of cutting all high frequency band components is performed irrespective of the surrounding situation, and when the medium level of the sounding prevention control is selected, processing of generating driving signal information is performed such that the degree of cutting of the high frequency band components changes in accordance with the surrounding situation.

In this embodiment, five options are provided such that the audible level can be selected from five levels of 1 to 5. The audible level 5 is a state in which the sounding prevention control is off. The audible levels 1 to 4 are states in which the sounding prevention control is on.

At the audible level 1, as when the low audible level is selected in the first embodiment, the sounding prevention control for cutting all high frequency band components is constantly performed irrespective of the surrounding environment information including the insertion/removal information of the headphones.

At the audible levels 2 to 4, as when the medium audible level is selected in the first embodiment, the sounding prevention control according to the surrounding environment information is performed, and the larger the audible level value, the weaker the sounding prevention control.

When the audible levels 2 to 4 are selected, processing of generating the vibration control information is performed such that the degree of cutting of the high frequency band components changes in accordance with the surrounding situation. This processing of generating the vibration control information is performed using the control pattern selected on the basis of the sounding prevention control value Nv as in the first embodiment. In this embodiment, a coefficient L corresponding to the audible level is used when calculating the sounding prevention control value Nv.

The coefficient L corresponding to the audible level is prepared at each of the audible levels 2, 3, and 4. As the audible level value becomes smaller, i.e., the sounding prevention control becomes stronger, the value of the coefficient L increases. The sounding prevention control value Nv is obtained by the following equation.

$$Nv = (a \cdot D + b \cdot P + c \cdot A) \cdot L \qquad \text{[Formula 2]}$$

In this way, in a case of finer setting of the audible level, the control pattern may be configured to be set in accordance with the audible level (environment setting) set by the user using the coefficient L and the surrounding situation. Also with such a configuration, it is possible to provide the user with a sense of presence according to the content by vibration while reducing the sounding of the controller in accordance with the surrounding environment.

It should be noted that although the coefficient L is used here, the thresholds Na, Nb, Nc, . . . of Nv for determining the control pattern may be changed and prepared for each audible level without preparing the coefficient L. Alternatively, the control pattern may be changed and prepared for each audible level. Further, in a case where the audible level is set more finely, a larger number of control patterns may be prepared.

Fourth Embodiment

Figure 9:
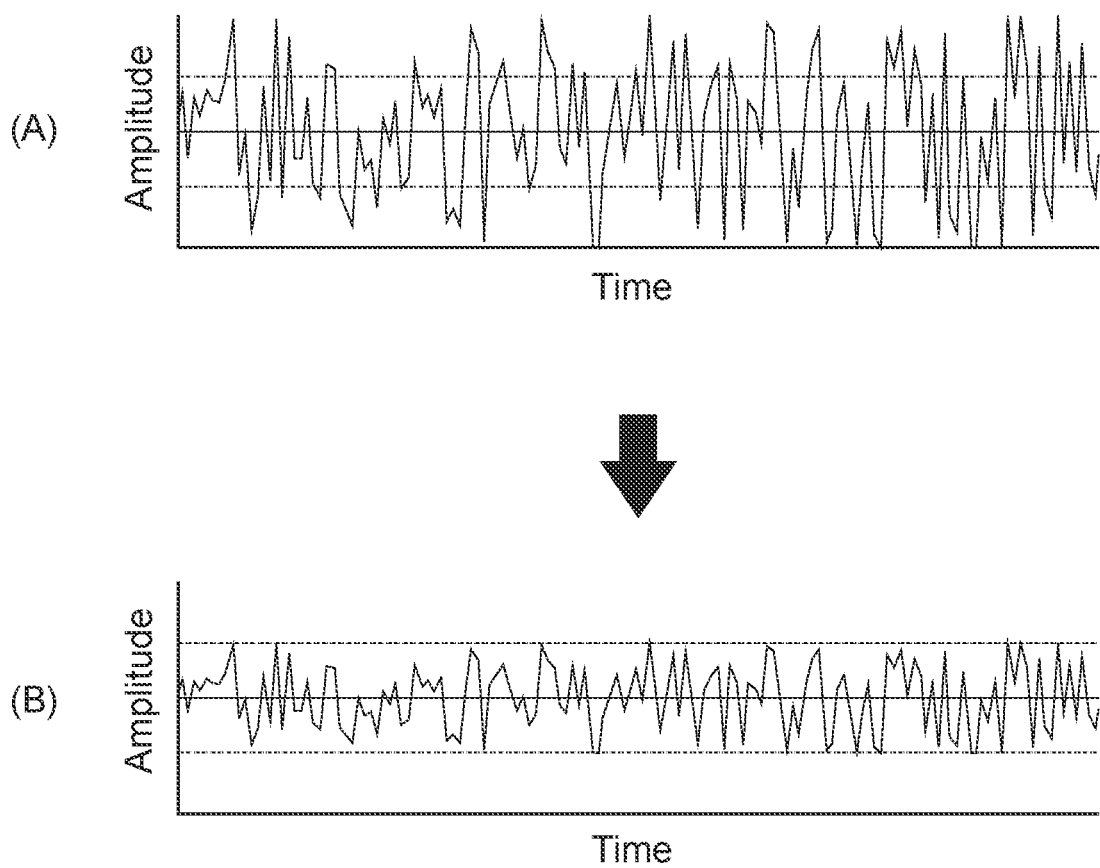
FIG. 9 A diagram for describing another example of a sounding prevention control method according to a fourth embodiment.

Although in the above-mentioned embodiments, the sounding prevention control processing is performed to cut entirely or partially sound components in the high frequency band using the low-pass filter, a configuration to reduce the sounding by controlling the vibration of the actuator such that the driving voltage of the actuator is reduced to attenuate the amplitude may be employed as shown in FIG. 9. FIG. 9(A) is an example showing a change over time of the amplitude of the driving voltage before control and FIG. 9(B) is an example showing a change over time of the amplitude of the driving voltage after control.

In this case, the degree of sounding can be adjusted by adjusting the degree of attenuation of the amplitude in accordance with the surrounding situation. Therefore, it is possible to reduce the discomfort due to the sounding caused by vibration of the actuator 22 to the person around the user. Further, since the vibration is not completely lost, it is possible to provide the user a sense of presence according to the content.

Fifth Embodiment

Figure 10:
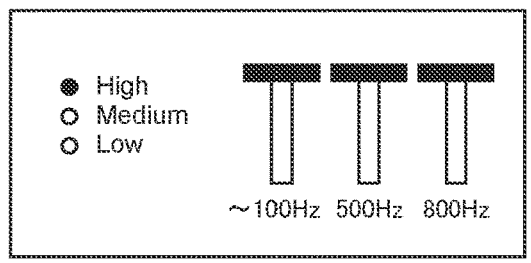
FIG. 10 An example of an environment setting screen for selecting an audible level displayed on a display unit in a fifth embodiment.
Figure 10:
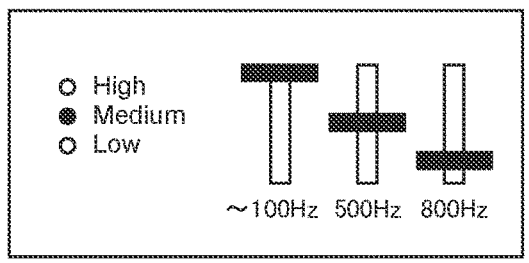
Figure 10:
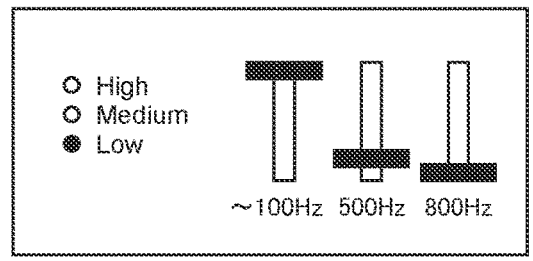
Figure 10:
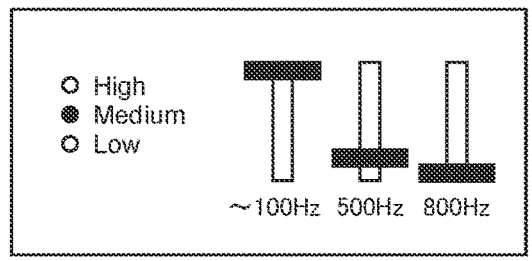

In the first embodiment, an example is given in which the screen for selecting one of three set levels of the "high audible level", the "medium audible level", and the "low audible level" is displayed as the environment setting screen, though not limited thereto. FIG. 10 is another example of the environment setting screen displayed on the display unit.

As shown in FIG. 10, the environment setting screen includes display for selecting the audible level located on the left side of the screen from three levels of high, medium, and low, and display of an equalizer indicating the frequency level of the sound from the controller caused by vibration of the actuator located on the right side of the screen.

In FIGS. 10(A) to 10(C), the environment setting screen is configured such that when the audible level is selected, the frequency level of the equalizer changes automatically. FIG. 10(A) shows a screen when the high audible level is selected. When the high audible level is selected, the sounding prevention control is not performed. FIG. 10(B) shows a screen when the medium audible level is selected. When the medium audible level is selected, weak sounding prevention control is performed. FIG. 10(C) is a screen when the low audible level is selected. When the low audible level is selected, strong sounding prevention control is performed and processing of cutting all high frequency band components is performed.

The relation between the audible level and the frequency level may be set for each game title, may be set for each game console, or may be set for each input device connected to the game console main body such as the controller. Alternatively, calibration may be performed at the first time and setting may be possible for each user.

Further, on each environment setting screen, the output level at each frequency may be arbitrarily corrected by the user by moving the knob of the slider bar of the equalizer screen.

Here, the vibration intensity of the device such as the controller and the smartphone on which the actuator is mounted can be adjusted by changing the driving voltage of the actuator. For example, the vibration intensity may be selectable by the user from three levels of high, medium, and low such that the frequency level in the sounding prevention control varies in accordance with the vibration intensity different from each other.

For example, FIG. 10(B) is a screen example when the medium vibration intensity corresponding to the normal vibration intensity is selected and the medium audible level is selected. FIG. 10(D) shows a screen example when the high vibration intensity is selected and the medium audible level is selected. When the high vibration intensity is selected, the driving voltage of the actuator becomes higher and the amplitude of the driving signal becomes larger overall, such that the sound in the high frequency band becomes more audible than that when the normal vibration intensity (medium vibration intensity) is selected.

Therefore, as long as the high vibration intensity is selected even when in the medium audible level is selected, processing of further reducing the output level of the high frequency band than when the medium vibration intensity is selected is performed, and the frequency level as shown in FIG. 10(D) is displayed. Thus, the frequency level may be set for each vibration intensity different from each other.

Sixth Embodiment

Figure 11:
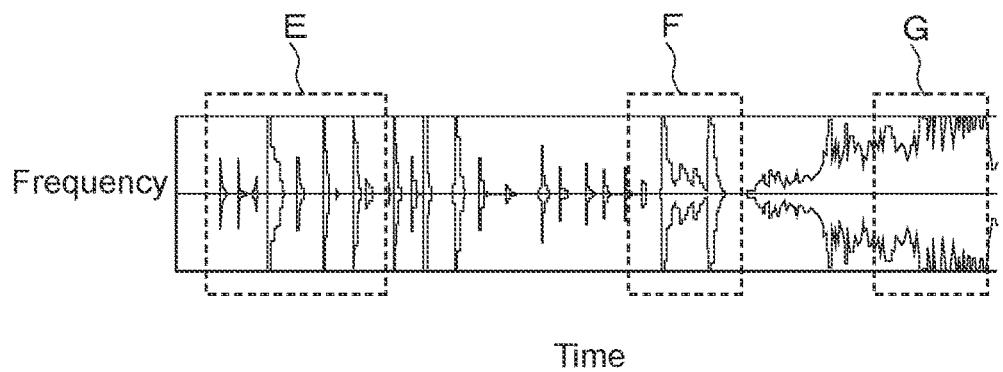
FIG. 11 A diagram for describing another example of the sounding prevention control method in a sixth embodiment.

During the sounding prevention control, a variable sounding prevention control processing may be performed in time series in view of a vibration signal. Hereinafter, the description will be given with reference to FIG. 11. FIG. 11 shows a speech waveform of the vibration signal. The horizontal axis indicates a time and the vertical axis indicates a frequency.

As shown in FIG. 11, for example, a region E surrounded by the broken line includes few high frequency band components. In this case, the sounding prevention control is not performed. A region F includes slightly more high frequency band components. In this case, the sounding prevention control to cut high frequency band components through a gentle low-pass filter is performed. A region G includes quite a few high frequency band components. In this case, the sounding prevention control to cut all high frequency band components is performed.

Thus, the sounding prevention control processing may be varied in accordance with how the high frequency band components are included in view of the vibration signal.

Other Embodiments

Embodiments of the present technology are not limited to the above-mentioned embodiments, and various modifications can be made without departing from the gist of the present technology.

For example, in the above-mentioned embodiments, the game console main body or the cloud server which is the stationary game console is taken as an example of the information processing apparatus including the vibration control unit, but the information processing apparatus may be in any form such as a personal computer, a smartphone, a mobile phone, a portable game console, a tablet, and the like.

Further, as a sensing device for sensing the surrounding environment information, for example, an infrared sensor may be used to detect a person in addition to the sensing device described above.

Further, in the first embodiment, in addition to obtaining the sensing data from the camera or the game console main body, a configuration to use sensing data information obtained by another device, for example, a controller or a smartphone including a sensing device may be employed. Also in the second embodiment, a configuration to use sensing data information of a person around the user, which is obtained from a device such as a smartphone including a sensing device may be employed.

Also, although in the above-mentioned embodiments, the user can select the degree of sounding prevention control (audible level) when sounding prevention control is turned on, a configuration in which the user can select one of only two options to turn on or off the sounding prevention control simply may be employed.

In this case, the sounding prevention control is not performed when turning off the sounding prevention control is selected. On the other hand, when turning on the sounding prevention control is selected, the same sounding prevention control processing as that performed when the medium audible level is selected in the first embodiment is performed, and processing according to the surrounding situation of the user is performed.

In a case where a plurality of different types of input devices may be configured to be connectable to the game console main body and actuators are mounted on these input devices, a threshold value of the sounding prevention control value Nv used when determining the control pattern is set for each input device. It is because the outer shape differs depending on the input devices and the possibility of sounding thus differs depending on the input devices, and different thresholds are set for different types of input devices.

Further, although it is assumed that there is a single person around the user U holding the controller 2 in the above-mentioned embodiments, when the sounding prevention control is turned on in a case where it is determined that there is a plurality of persons around the user U on the basis of the sensing data information, a setting may be made to perform control to generate vibration control information in which all the high frequency band components are cut for suppressing the sounding, considering the usability.

In the above-mentioned embodiments, the headphones with the cord are taken as an example of the audio output apparatus which is the connectable audio device, though a configuration to use a type without a cord such as wireless headphones may be used.

In a case where the wireless headphones are used, the headphones are communicable using a short-range wireless communication standard such as Bluetooth (trademark) with an information processing apparatus (game console main body in the first embodiment) or an electronic apparatus (smartphone in the second embodiment) connected to the information processing apparatus (cloud server in the second embodiment). By turning on/off Bluetooth, the headphones are connected or disconnected. Based on the on/off information of Bluetooth, it is determined whether or not the headphones are connected to the information processing apparatus or the electronic apparatus connected to the information processing apparatus.

It should be noted that the headphones include various forms of headphones such as inner ear type, canal type, headband type, neckband type, ear type, and clip type. Further, although in the above-mentioned embodiments, the headphones put on the ears are taken as an example of the audio output apparatus, a neck-hanging type speaker may be used, for example, and it is sufficient to output a sound mainly to the user U. This neck-hanging type speaker is a device including a speaker unit positioned around both shoulders when the device is hanging from the neck, the device outputting a sound from there. The connection between the audio output apparatus and the information processing apparatus or the electronic apparatus connected to the information processing apparatus may be wired or may be wireless.

Further, in the above-mentioned embodiments, the example in which the sounding prevention control is performed using the device information and the sensing data information has been described, though not limited thereto. For example, irrespective of whether or not the audio output apparatus is connected as the device information, the sounding prevention control may be performed by using only the sensing data information to determine the surrounding situation such as information related to the surrounding person.

Further, in the above-mentioned embodiments, the high frequency band is set to 100 Hz or more in advance, and the processing is performed with this numerical value fixed, through the range of the high frequency band may be made variable in accordance with the surrounding situation.

It should be noted that the present technology may also take the following configurations.

(1) An information processing apparatus, including
a vibration control unit that controls vibration of a vibration output unit to change a sound caused by the vibration of the vibration output unit on the basis of surrounding environment information of an input device including a vibration output unit, the input device being held by a user.

(2) The information processing apparatus according to (1), in which
the environment information is information associated with a person around the input device.

(3) The information processing apparatus according to (2), in which
the information associated with the person includes attribute information of the person.

(4) The information processing apparatus according to (2) or (3), in which
the information associated with the person includes action information of the person.

(5) The information processing apparatus according to any one of (1) to (4), in which the vibration control unit controls the vibration of the vibration output unit to damp the vibration of the vibration output unit on the basis of the environment information.

(6) The information processing apparatus according to any one of (1) to (5), in which
the information processing apparatus or an electronic apparatus that connects to the information processing apparatus is configured such that an audio output apparatus is connectable to the information processing apparatus or the electronic apparatus, and
the environment information includes information about a connection state of the audio output apparatus.

(7) The information processing apparatus according to any one of (1) to (6), in which
the environment information includes information that is obtained by a sensing device mounted on the input device or an apparatus different from the input device.

(8) The information processing apparatus according to (7), in which
the sensing device includes at least one of an audio obtaining device that collects ambient sounds, an image obtaining device that captures an image of a periphery of the input device, position information obtaining device that detects position information, an acceleration information obtaining device that detects acceleration information, or a direction information obtaining device that detects direction information.

(9) The information processing apparatus according to any one of (1) to (8), in which
the vibration control unit controls the vibration of the vibration output unit on the basis of an audible level of the sound caused by the vibration of the vibration output unit, the audible level being set by the user.

(10) The information processing apparatus according to any one of (1) to (9), in which
the vibration control unit controls the vibration of the vibration output unit on the basis of the environment information and information associated with the input device.

(11) The information processing apparatus according to (10), in which
the information associated with the input device is a natural frequency of a casing constituting the input device.

(12) The information processing apparatus according to any one of (1) to (11), in which
the vibration has a first frequency band and a second frequency band having a frequency higher than a frequency of the first frequency band, and
the vibration control unit partially or entirely cuts components in the second frequency band and controls the vibration of the vibration output unit on the basis of the environment information.

(13) The information processing apparatus according to (12), in which
the vibration control unit controls the vibration of the vibration output unit through a low pass filter.

(14) An information processing method, including
controlling vibration of a vibration output unit to change a sound caused by the vibration of the vibration output unit on the basis of surrounding environment information of an input device including a vibration output unit, the input device being held by a user.

(15) A non-transitory information processing apparatus-readable recording medium that records a program for causing an information processing apparatus to execute processing including the step of
controlling vibration of a vibration output unit to change a sound caused by the vibration of the vibration output unit on the basis of surrounding environment information of an input device including a vibration output unit, the input device being held by a user.

REFERENCE SIGNS LIST 2 controller (input device)
3 game console main body (information processing apparatus, apparatus)
5 headphones (audio output apparatus)
8 camera (apparatus)
22 actuator (vibration output unit)
34, 74 memory (non-transitory information processing apparatus-readable recording medium)
60 cloud server (information processing apparatus)
70 smartphone (electronic apparatus, input device)
81, 722 imaging element (sensing device, image obtaining device)
82, 321, 721 microphone (sensing device, audio obtaining device)
83, 322, 723 GPS receiver (sensing device, position information obtaining device)
312 vibration control unit
724 acceleration sensor (sensing device, acceleration information obtaining device)
725 geomagnetic sensor (sensing device, direction information obtaining device)
U user

The invention claimed is:

1. An information processing apparatus, comprising:
a vibration control unit configured to control vibration of a vibration output unit to change a sound caused by the vibration of the vibration output unit on a basis of surrounding environment information of an input device including the vibration output unit, the input device being held by a user,
wherein the environment information of the input device includes a distance from the user to a person around the input device,
wherein the environment information further includes information associated with the person around the input device including attribute information of the person,
wherein the attribute information of the person includes an age of the person, and
wherein the vibration control unit is implemented via at least one processor.

2. The information processing apparatus according to claim 1, wherein
the information associated with the person further includes action information of the person.

3. The information processing apparatus according to claim 1, wherein
the vibration control unit controls the vibration of the vibration output unit to damp the vibration of the vibration output unit on a basis of the environment information.

4. The information processing apparatus according to claim 3, wherein
the information processing apparatus or an electronic apparatus that connects to the information processing apparatus is configured such that an audio output apparatus is connectable to the information processing apparatus or the electronic apparatus, and
the environment information includes information about a connection state of the audio output apparatus.

5. The information processing apparatus according to claim 4, wherein the environment information includes information that is obtained by a sensing device mounted on the input device or an apparatus different from the input device.

6. The information processing apparatus according to claim 5, wherein
the sensing device includes at least one of an audio obtaining device that collects ambient sounds, an image obtaining device that captures an image of a periphery of the input device, position information obtaining device that detects position information, an acceleration information obtaining device that detects acceleration information, or a direction information obtaining device that detects direction information.

7. The information processing apparatus according to claim 6, wherein
the vibration control unit controls the vibration of the vibration output unit on a basis of an audible level of the sound caused by the vibration of the vibration output unit, the audible level being set by the user.

8. The information processing apparatus according to claim 7, wherein
the vibration control unit controls the vibration of the vibration output unit on a basis of the environment information and information associated with the input device.

9. The information processing apparatus according to claim 8, wherein
the information associated with the input device is a natural frequency of a casing constituting the input device.

10. The information processing apparatus according to claim 9, wherein
the vibration has a first frequency band and a second frequency band having a frequency higher than a frequency of the first frequency band, and
the vibration control unit partially or entirely cuts components in the second frequency band and controls the vibration of the vibration output unit on a basis of the environment information.

11. The information processing apparatus according to claim 10, wherein
the vibration control unit controls the vibration of the vibration output unit through a low pass filter.

12. The information processing apparatus according to claim 1, wherein
the vibration control unit controls the vibration of the vibration output unit by performing control of each frequency band of a plurality of frequency bands.

13. An information processing method, comprising:
controlling vibration of a vibration output unit to change a sound caused by the vibration of the vibration output unit on a basis of surrounding environment information of an input device including the vibration output unit, the input device being held by a user,
wherein the environment information of the input device includes a distance from the user to a person around the input device;
wherein the environment information further includes information associated with the person around the input device including attribute information of the person, and
wherein the attribute information of the person includes an age of the person.

14. A non-transitory information processing apparatus-readable recording medium having embodied thereon a program, which when executed by an information processing apparatus causes the information processing apparatus to execute a method, the method comprising:
- controlling vibration of a vibration output unit to change a sound caused by the vibration of the vibration output unit on a basis of surrounding environment information of an input device including the vibration output unit, the input device being held by a user,
- wherein the environment information of the input device includes a distance from the user to a person around the input device,
- wherein the environment information further includes information associated with the person around the input device including attribute information of the person, and
- wherein the attribute information of the person includes an age of the person.

* * * * *